Jan. 17, 1956  J. B. BRIGHTMAN  2,731,587
MOTOR PROTECTIVE SYSTEM
Filed Sept. 16, 1954
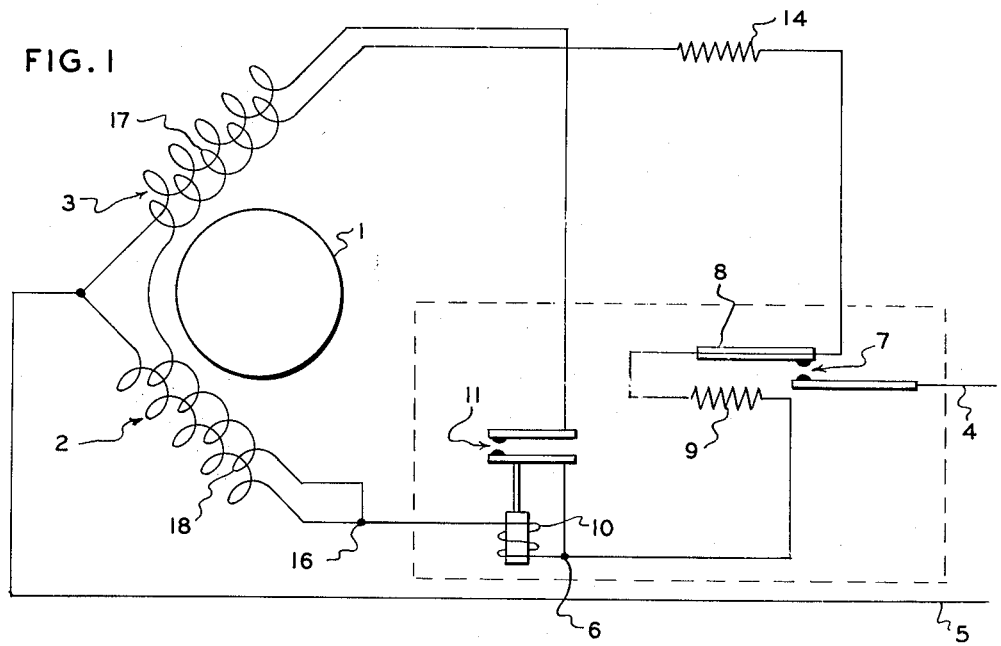
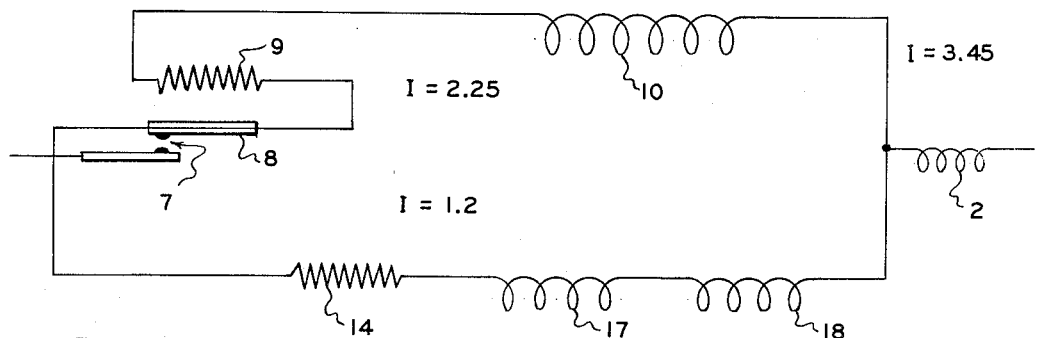
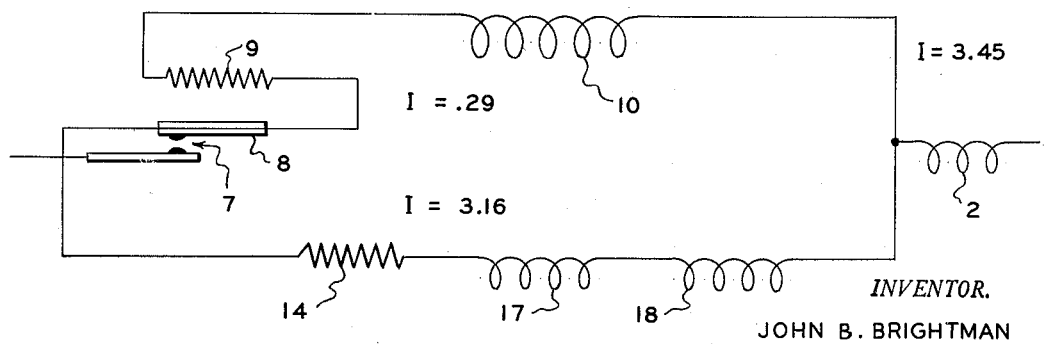
INVENTOR.
JOHN B. BRIGHTMAN
BY
HIS ATTORNEY

2,731,587
MOTOR PROTECTIVE SYSTEM

John B. Brightman, Louisville, Ky., assignor to General Electric Company, a corporation of New York Application September 16, 1954, Serial No. 456,386

3 Claims. (Cl. 318—221)

This invention relates to motor protective devices and, more particularly, to devices for protecting high speed single phase motors.

While a single phase motor is running, suitable means operated by said motor are provided for cooling the motor so that the windings will not become overheated due to the large current passing therethrough. However, when the motor stalls, for example, and the high current is still supplied to the main winding, it will be obvious that the main winding will soon burn out if suitable means are not provided for removing this heat or the flow of current is not stopped.

In hermetic compressors of the refrigeration type, the motor is disposed within a sealed casing so that air cannot be employed to cool the windings unless there is conduction from the windings to the casing. If the motor is suspended in the casing by springs, for example, then obviously there is no means of conducting the heat to the casing when the rotor stalls so that the windings will burn out if the flow of current is not stopped in this type of motor.

While it is desirable to stop the flow of current as soon as possible after the rotor stalls, it is still necessary in some single phase motors used in hermetic compressors, for example, that a high current, which will damage the windings quickly if the rotor stalls, be supplied to operate the motor.

A primary object of the present invention is to provide a motor protective system that permits a high current to be supplied to the main winding of the single phase motor when the motor is running but stops the flow of current to the running winding when the rotor stalls at a much lower current than required to operate the motor.

Another object of the present invention is to provide a motor protective system that permits a low rated overload as a motor protector for a single phase motor operated on a relatively high current.

A still further object of the present invention is to provide an inexpensive motor protective system for an electric motor.

Further objects and advantages of the invention will become apparent as the following description proceeds and the features of novelty which characterize the invention will be pointed out with particularity in the claims annexed to and forming a part of this specification.

In accordance with this invention the single phase motor has an auxiliary circuit connected in parallel with at least a portion of the running circuit, which includes the running winding. The single phase motor also includes a starting circuit having the starting winding therein. Current is supplied to the circuits from a power supply line that has contacts connecting the circuits with the supply line. These contacts are prevented from opening when the rotor is rotating during normal operation by means in the auxiliary circuit; and also by such means are opened when the rotor stalls.

For a better understanding of the invention reference may be had to the accompanying drawing, in which:

Fig. 1 is a wiring diagram of a single phase motor embodying the present invention;

Fig. 2 is a schematic wiring diagram of a part of a circuit of the present invention; and Fig. 3 is a schematic wiring diagram like Fig. 2 of a part of a circuit of the present invention.

Referring to the drawing and particularly Fig. 1, there is shown a single phase electric motor comprising a rotor 1, a main or running winding 2, and a starting winding 3. A power line 4 is connected to one side of the running circuit that includes the running winding 2 and a second power line 5 is connected to the opposite side of the running circuit to which one end of the starting circuit that includes the starting winding 3 is also connected. The other end of the starting circuit is connected at 6 to the running circuit. A pair of overload contacts 7 are provided to connect the power line 4 with the running circuit. Disposed in the running circuit between the running winding 2 and the power line 4 are a bimetal member or strip 8, a resistance heater 9, and a pickup coil 10. It will be observed that the starting circuit is connected to the running circuit between the heater 9 and the pickup coil 10.

Starting contacts 11 operated by the coil 10 are positioned in the starting circuit. When the motor first starts, there is a high surge of current through the running winding so that the pickup coil 10 is energized sufficiently to close the starting contacts 11 so that the starting winding is also energized. However, as the motor begins to reach its desired speed the impedance of the running winding circuit increases so that the current is reduced. When the current is reduced to a predetermined amount corresponding to a predetermined speed of the motor, the pickup coil 10 will be insufficiently energized to hold the starting contacts 11 closed. Thus, the contacts 11 will open and the starting winding 3 will be de-energized.

The bimetal member 8 serves to actuate at least one of the overload contacts 7 to break the contacts, which are preferably spring biased to their closed position, whenever the heat generated by the current passing through heater 9 and bimetal 8 is sufficient to expand the bimetal 8. This heater 9 and bimetal 8 will produce the required amount of heat when carrying a predetermined current for a predetermined period.

This type of overload protector is satisfactory where the current that will damage the windings if the rotor is not running is greater than the current that is required to energize the motor during running. This type of overload protection is also adequate whenever part of the heat generated in the winding if the rotor is not running is removed by auxiliary means. However, this type of protective device is inadequate by itself when the current that is required to operate the motor is greater than the current that will burn out or damage the windings if the rotor fails to run due to low voltage, for example, or stalls during operation. This type of protective device is also unsatisfactory if no heat is removed by auxiliary means when the rotor stalls during operation or fails to run due to low voltage, for example. The present invention permits the motor to operate at a high current but to be protected from lower currents, which will damage the windings, when the rotor stalls or fails to run due to low voltage, for example.

An auxiliary circuit including a resistance 14 is connected to the running circuit at the bimetal 8. The other end of the auxiliary circuit is connected at 16 to the running circuit between the pickup coil 10 and the running winding 2. An induced voltage coil in the auxiliary circuit has turns 17 in intimate magnetic relationship with the starting winding and turns 18 in intimate magnetic relationship with the running winding. It will be understood that these turns either could be combined to form a single coil or could be two separate coils; the only requirement being that the vector sum of the voltages induced in the auxiliary circuit turns in the running winding and starting winding be substantially the same whether a single coil or two coils are used.

As is well known, the starting winding has an induced voltage due to the speed of the rotor and the running winding has a voltage therein due to the line voltage being impressed thereacross. When the rotor is rotating, the coil in the auxiliary circuit picks up the voltage in both the starting winding and the running winding with the result that the auxiliary circuit has a negative impedance. This is due to the fact that the voltage generated in the starting winding turns 17 of the induced voltage coil of the auxiliary circuit is approximately ninety degrees out of phase with the voltage generated in the running winding turns 18 of the induced voltage coil of the auxiliary circuit.

Thus, by phasing the turns properly, their vector sum can be made to provide a negative impedance when the motor is running. By providing the negative impedance in the auxiliary circuit, it will be observed that most of the current will flow through the auxiliary circuit rather than pass through the resistance heater 9 and bimetal 8 so that the overload contacts 7 will not be opened when the rotor is running even though a large current is passing through the running winding, the large current passing through the running winding would open the overload contacts in a short period if passing through heater 9.

When the rotor stops rotating, there is no longer any voltage induced in the starting winding so that there is no voltage generated in the starting turns 17. This results in only the turns 18 having a voltage generated therein from the running winding so that the auxiliary circuit has a positive impedance that reduces the current flowing therethrough. This, of course, causes more current to pass through the heater 9 and bimetal 8 so that it heats bimetal member 8 sufficiently to actuate the contacts 7 to open the supply of current. It will be understood that the operation is dependent on both the amount and duration of the current.

As there is no voltage induced in the starting winding if the rotor remains stationary due to a low voltage condition that prevents starting of the motor and the motor fails to start after a predetermined period, the contacts 7 will be opened to stop the supply of current particularly if the current is of sufficient value to damage the windings. Low voltage conditions may exist where the windings will not be damaged due to the low current. When this occurs, the current flowing through the bimetal 8 is not sufficient to heat the bimetal enough to actuate the contacts 7 to break the running circuit since the windings will not be damaged. Therefore, the present invention will protect the motor not only when the rotor stalls but also when the motor fails to start due to a low voltage condition that will damage the windings.

Figs. 2 and 3 illustrate the current flow through the auxiliary circuit, through the portion of the running circuit including the bimetal member 8, the heater 9, and the pickup coil 10, and through the portion of the running circuit having the running winding 2 therein. The resistance 14 is adjustable to provide for different ratios of current between the auxiliary circuit and the portion of the running circuit containing the bimetal member 8, the heater 9, and the pickup coil 10. However, the resistance 14 must be so adjusted that the current in the portion of the running circuit is sufficient to cause the bimetal member 8 to open the overload contacts 7 before the windings are damaged if the rotor stalls or remains stationary. Likewise, the resistance 14 must be adjusted so that the current in this portion of the running circuit will not heat the bimetal member 8 to cause the contacts 7 to open when the rotor is running.

If the running winding current is assumed to be 3.45 amperes in order for the motor to operate under a heavy load, one example of the ratios of current as illustrated in Fig. 2 shows only .29 ampere flows through the portion of the running circuit containing the bimetal member 8, heater 9, and pickup coil 10 while 3.16 amperes flows through the auxiliary circuit due to the negative impedance produce by the rotor running. This amount of current (.29 ampere) is not sufficient to heat the bimetal member 8 to cause the contacts 7 to open and stop the supply of current.

In Fig. 3, there is illustrated the condition with the rotor stationary or in the stalled condition with 3.45 amperes again being supplied to the portion of the running circuit containing the running winding. This amount of current with the rotor stalled or in a stationary condition will quickly damage the windings. Due to the rotor not running, a positive impedance exists in the auxiliary circuit so that only 1.2 amperes flows therethrough. This results in 2.25 amperes, in this example, flowing through the heater 9 whereby the bimetal member 8 will quickly actuate the contacts to open so that the supply of current is stopped. It will be understood that the turns 17 and 18 are in intimate magnetic relationship with the starting winding 3 and running winding 2, respectively, though they have been shown schematically in Figs. 2 and 3.

In Figs. 2 and 3 it will be noted that the current in the circuit including bimetal strip 8 is the vector sum of the current in the auxiliary circuit and the running winding circuit. While these currents are in phase in the illustrated examples and therefore add numerically, it will be understood that the currents could be out of phase and thus not add numerically.

The overload contacts 7, bimetal member 8, heater 9, pickup coil 10, and starting contacts 11 are all shown enclosed within a phantom line. All of these members within the phantom line are part of an ordinary relay though it is not necessary for these parts to be a single relay in order for the invention to be operative. Depending on the type of relay selected, it will be obvious that there are limitations as to the amount of current that is required to open the overload contacts. It will thus be observed that the resistance 14 must be adjusted accordingly as to the type of relay used.

When the rotor is rotating, there is a very low current through the pickup coil 10 as most of the current flows through the auxiliary circuit so that the starting contacts 11 will never be closed as long as the rotor is running. This prevents any problem of arcing or sticking that sometimes occurs where the starting contacts are closed by a pickup coil. Due to the low current passing through the heater 9 when the rotor is running, there is no problem of the overload contacts 7 opening accidentally.

This invention is more advantageous than a protective device employing a wire resistance since the latter is difficult to adjust for the wide operating voltage range, which is incurred in normal use of single phase motors. This invention has the advantage of being much cheaper than a voltage coil protective device so that a large saving is possible. This invention also has the advantage of permitting a single overload to be employed for motors of several different sizes rather than a specifically designed overload for each motor.

It will be understood that when the claims recite that the rotor is not running that this includes both when the rotor stalls due to an overload or a drop in voltage and when the rotor fails to start due to a low voltage condition, for example. However, it will be further understood that this recitation does not include a situation in which the voltage, which fails to start the motor, is so low that the current it supplies will not damage the windings since this current will not heat the bimetal member 8 sufficiently to actuate the overload contacts 7 to break the running circuit.

While the present invention has been described by reference to a particular embodiment thereof, it will be understood that modifications may be made by those skilled in the art without actually departing from the invention. Therefore, the appended claims are intended to cover all such variations as come within the true spirit and scope of the invention.

I claim:

1. In combination, a single phase motor including a rotor, a starting winding, and a running winding, starting and running circuits for the motor, said starting circuit including said starting winding, said running circuit including said running winding, an auxiliary circuit, a power supply line, overload contacts in said power supply line to connect said circuits with said power supply line, means in said running circuit to break said overload contacts to open said circuits when said current in said portion of said running circuit in which said breaking means are disposed exceeds a predetermined value, said auxiliary circuit including said breaking means and an induced voltage coil in said auxiliary circuit in magnetic relationship with said starting and running windings to prevent said current in said portion of said running circuit in which said breaking means are disposed from exceeding said predetermined value when said rotor is rotating.

2. In combination, a single phase motor including a rotor, a starting winding, and a running winding, starting and running circuits for the motor, said starting circuit including said starting winding, said running circuit including said running winding, a power supply line, contacts in said power supply line to connect said circuits with said power supply line, means for operating said power supply line contacts, contacts in said starting circuit to open said starting circuit, solenoid means in said running circuit to open said starting contacts when said motor reaches a predetermined speed, and an auxiliary circuit including said power supply line contact operating means, said solenoid means and an induced voltage coil having turns disposed in said starting and running windings, said auxiliary circuit having a negative impedance resulting from the location of said coil when said rotor is rotating to prevent said starting contacts from closing and said supply contacts from opening.

3. In combination, a single phase motor including a rotor, a starting winding, and a running winding, starting and running circuits for said motor, an auxiliary circuit, a power supply line, overload contacts in said power supply line to connect said circuits with said power supply line, said running circuit including in series a bimetal member to actuate at least one of said overload contacts to make and break said circuit, a heater, a pickup coil, and said running winding, said starting circuit including starting contacts closed by energization of said pickup coil and said starting winding, one end of said auxiliary circuit being connected to said running circuit between said overload contacts and said bimetal member, the other end of said auxiliary circuit connected to said running circuit between said pickup coil and said running winding, an induced voltage coil in said auxiliary circuit, said induced voltage coil having turns disposed in both said starting and running windings, said auxiliary circuit having a negative impedance when said rotor is rotating resulting from the voltage picked up by said induced voltage coil from said starting and running windings to prevent said overload contacts from opening and said starting contacts from closing, said auxiliary circuit having a positive impedance when said rotor is not running whereby said overload contacts may be opened.

References Cited in the file of this patent

UNITED STATES PATENTS

| 1,991,035 | Werner | Feb. 12, 1935 |
| 1,997,673 | Boothby | Apr. 16, 1935 |
| 2,165,082 | Weber | July 4, 1939 |
| 2,166,323 | Raney | July 18, 1939 |
| 2,250,141 | Thurston | July 22, 1941 |
| 2,255,437 | Pearce | Sept. 9, 1941 |
| 2,346,341 | Werner | Apr. 11, 1944 |
| 2,414,531 | Johns | Jan. 21, 1947 |
| 2,691,127 | Oliwa | Oct. 5, 1954 |